United States Patent
Bhatti et al.

(10) Patent No.: US 7,522,768 B2
(45) Date of Patent: Apr. 21, 2009

(54) CAPTURE AND SYSTEMATIC USE OF EXPERT COLOR ANALYSIS

(75) Inventors: Nina Bhatti, Mountain View, CA (US); Harlyn Baker, Los Altos, CA (US); Michael Harville, Palo Alto, CA (US); Sabine Susstrunk, Lausanne (CH)

(73) Assignee: Hewlett-Packard Development Company, L.P., Houston, TX (US)

( * ) Notice: Subject to any disclaimer, the term of this patent is extended or adjusted under 35 U.S.C. 154(b) by 824 days.

(21) Appl. No.: 11/233,601

(22) Filed: Sep. 9, 2005

(65) Prior Publication Data

US 2007/0071314 A1 Mar. 29, 2007

(51) Int. Cl.
*G06K 9/00* (2006.01)
(52) U.S. Cl. ...................................... 382/167; 382/162
(58) Field of Classification Search ................. 382/167, 382/162, 274, 293, 284; 345/88, 13, 4; 358/1.15, 358/1.14, 461, 518; 348/36, 218.1
See application file for complete search history.

(56) References Cited

U.S. PATENT DOCUMENTS

| | | | |
|---|---|---|---|
| 5,313,267 A | | 5/1994 | MacFarlane et al. |
| 5,478,238 A | | 12/1995 | Gouriou et al. |
| 6,243,059 B1 | * | 6/2001 | Greene et al. ................. 345/88 |
| 6,603,571 B1 | * | 8/2003 | Nomoto ..................... 358/1.15 |
| 2006/0178904 A1 | | 8/2006 | Aghassian et al. |

FOREIGN PATENT DOCUMENTS

WO    WO 0104839    1/2001

* cited by examiner

*Primary Examiner*—Anh Hong Do

(57) ABSTRACT

Embodiments of the present invention recite a method of compiling color analysis parameters. In one embodiment of the present invention, a corrected color description of at least one test subject is constructed. The corrected color description of at least one test subject is then accessed. The at least one test subject is assigned to a classification color according the accessed corrected color description. The classification color is then correlated with a prescriptive recommendation.

24 Claims, 9 Drawing Sheets

100

```
START
  ↓
CONSTRUCTING A CORRECTED COLOR DESCRIPTION OF AT
LEAST ONE TEST SUBJECT FROM AN IMAGING SOURCE
110
  ↓
ACCESSING A COLOR DESCRIPTION OF AT LEAST ONE
TEST SUBJECT
120
  ↓
ASSIGNING THE AT LEAST ONE TEST SUBJECT TO A CLASS
ACCORDING TO THE CORRECTED COLOR DESCRIPTION
130
  ↓
CORRELATING THE CLASS WITH A PRESCRIPTIVE
RECOMMENDATION
140
  ↓
END
```

FIG. 1

CAPTURE AND SYSTEMATIC USE OF EXPERT COLOR ANALYSIS

TECHNICAL FIELD

Embodiments of the present invention are related to product consultation of personal appearance related products.

BACKGROUND

For many customers of cosmetics or other appearance related products, making a purchase decision is difficult due to the wide variety of variables involved in the purchase decision and the wide range of products from which the customer can choose. In the field of cosmetics, there are hundreds of cosmetics products in shades which complement or contrast the user's natural complexion color. Additionally, makeup styles change seasonally, and the time of day and location where the user will be may also affect the user's decision regarding which product will be worn. Thus, a user may want to present a different appearance during the day at an office than at night at a casual event. Hence, the cosmetics may need to be adjusted based upon the user's intended use.

To help them come to a decision regarding cosmetics purchases, many customers seek advice from a trained consultant. However, many retail stores only provide display space for cosmetics, but do not provide trained personnel who help the customer come to a decision regarding cosmetics purchases. Additionally, the ambient lighting at many retail stores can distort the customer's skin coloration, thus giving the customer a false impression of how the cosmetics look on their skin. For example, many retail stores use fluorescent lighting which radiates light with a slightly bluish tint. Also, some stores use coatings on their windows which filter natural sunlight in a particular range of the visible spectrum. Thus, many customers are making a "best guess" as to whether the cosmetics product is acceptable when worn by that particular user. As a result, customers often purchase cosmetics based upon how they look in the store only to find that they do not like how the cosmetics look when they get home. Additionally, for some types of cosmetics products (e.g., lipstick), the customer is not allowed to sample the product before purchase due to health concerns.

Another disadvantage with some retail stores is that the personnel at these stores typically have little interest in whether the customer purchases cosmetics or if the customer is satisfied with their purchase decision. Thus, these employees have little interest in representing a particular cosmetics brand in a manner which will persuade the customer to purchase that brand again. An expert is able to perform a consultation by looking at an individual and understanding the various factors, including those of the product and of the cosmetic effect desired, that will result in the best appearance of the customer.

For example, a cosmetic foundation is the first thin layer of makeup pigmentation that a woman applies to her face in order to unify its coloration. It is a base for further enhancement products that are subsequently introduced, such as mascara, blusher, etc. While foundations come in a variety of shades that are intended to closely match the wearer's general complexion, it can be very difficult for a woman to select the one that is correct for her. The difference between shades of foundation is subtle and not easy to distinguish, particularly in conditions in which the ambient lighting distorts the coloration of the wearer or foundation. Furthermore, the foundation is typically sold in bottles, in a liquid or cream form, and dries down to a different appearance. Correct selection does not depend solely on the wearer's skin color because factors such as the amount of sun damage and the presence of conditions such as acne, rosacea, and dermatitis all impact the desired choice. Thus, an expert does not merely match the wearer's skin color to a corresponding foundation color, but may also select a foundation color to compensate for the condition of the wearer's skin or skin coloration. For example, an expert makeup consultant will often recommend a foundation color with a slight yellow tint to compensate for excessive facial redness. Similarly, freckles may be subdued with a lighter shade overlay. Thus, the essence of foundation selection is more than an exact color match, it is also an effort to find a color that corrects or enhances the complexion.

The dependence on expert advice drives up the cost of selection. Thus, providing a consultant at each retail outlet is prohibitively expensive for manufacturers and experts are therefore typically available in high-end stores only. Additionally, many women, particularly teenagers, find the high-end in-store expert somewhat intimidating, and will avoid the purchase altogether.

Alternatively, many high-end cosmetics manufacturers operate their own proprietary retail space, also known as "makeup counters," within retail stores. These makeup counters are staffed with trained representatives who can provide advice to the customer as to which cosmetic shades are complementary to the skin coloration of that particular customer as well as current styles among which the customer may choose. Thus, the customer is presented with a smaller range of products from which to choose, but which are more suited for that customer based upon her needs. Additionally, the representatives can recommend other products which may complement the purchase being made by the customer and provide advice regarding current fashion trends.

At very high end retail spaces, the manufacturer may also provide a controlled infrastructure in which the lighting is carefully calibrated to provide the customer an accurate impression of what the cosmetics will look like when the customer leaves the store. Unfortunately, the cosmetics products sold by these manufacturers are typically much more expensive than those sold at the retail stores which do not provide any consultation.

DISCLOSURE OF THE INVENTION

Embodiments of the present invention recite a method of compiling color analysis parameters. In one embodiment of the present invention, a corrected color description of at least one test subject is constructed. The corrected color description of at least one test subject is then accessed. The at least one test subject is assigned to a classification color according the accessed corrected color description. The said classification color is then correlated with a prescriptive recommendation.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

FIG. 1 is a flowchart of a method for compiling color analysis parameters in accordance with embodiments of the present invention.

MODES FOR CARRYING OUT THE INVENTION

Figure 2:
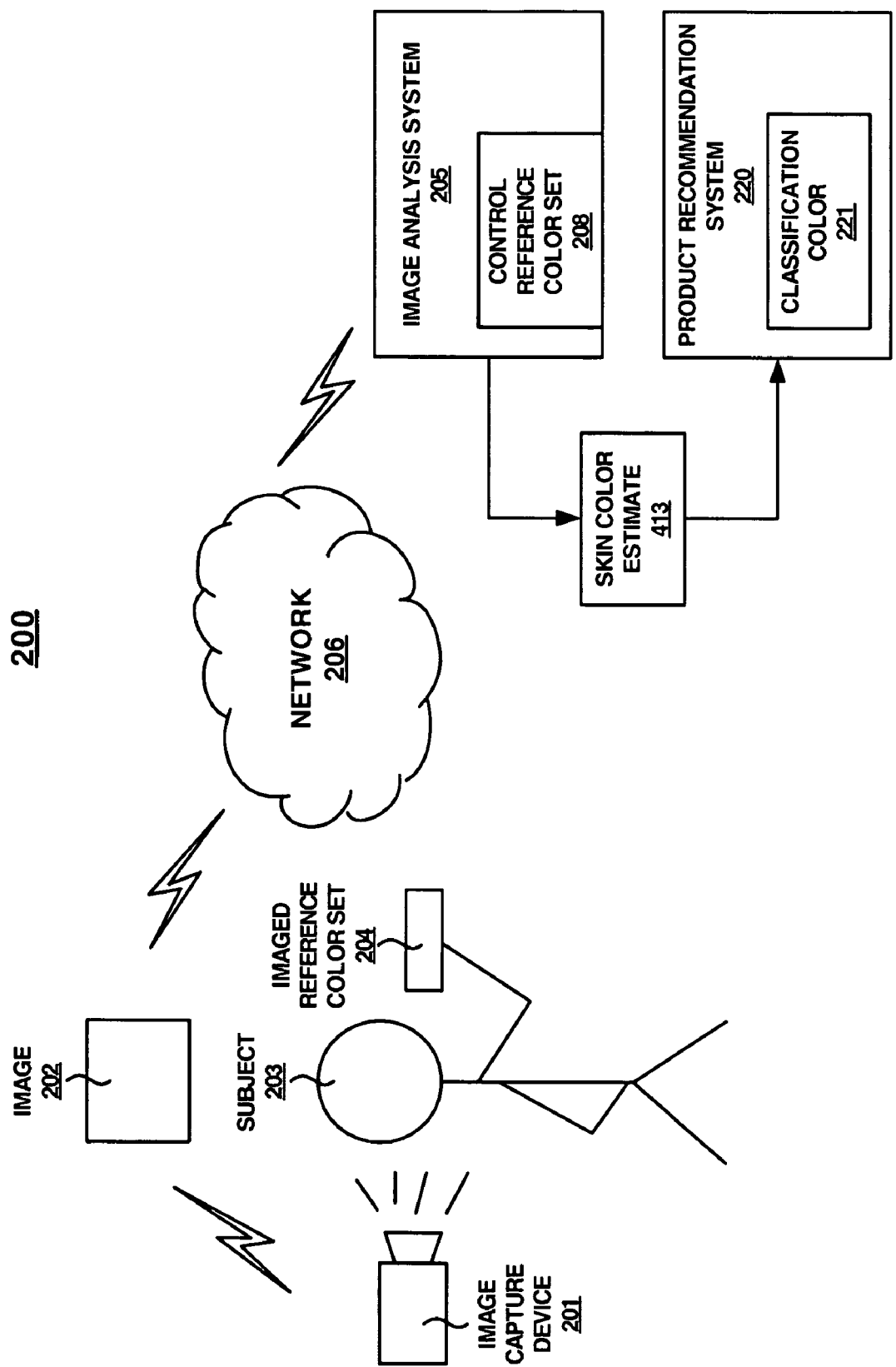
FIG. 2 shows an exemplary image capture system used in conjunction with embodiments of the present invention.

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "assigning," "correlating," "generating," "using," "comparing," "deriving," "determining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

FIG. 1 is a flowchart of a method 100 for compiling color analysis parameters in accordance with embodiments of the present invention. In step 110 of FIG. 1, a corrected color description of at least one test subject is constructed from an imaging source. In embodiments of the present invention, the combined effects of the ambient lighting conditions at the location at which an image of the test subject is captured as well as the device characteristics and image processing capabilities of the image capture system are inferred. These combined effects are then substantially eliminated from the image, or a color description thereof, such that a corrected color description (e.g., of the skin color of a subject) can be constructed.

In step 120 of FIG. 1, the corrected color description of at least one test subject is accessed. In embodiments of the present invention, the corrected color description from a training set comprising at least one test subject is accessed. In embodiments of the present invention, the test subject may be a person whose skin color is imaged. From this image, the corrected color description of that test subject is constructed. In embodiments of the present invention, the corrected color description may comprise a skin color estimate. In other embodiments of the present invention, the corrected color description is accessed from, for example, a database of previously generated color descriptions or corrected color descriptions. While the present embodiment describes corrected color descriptions of human test subjects, the corrected color description of the test subject may comprise a color description of a product (e.g., a cosmetic product) in embodiments of the present invention.

In step 120 of FIG. 1, the at least one test subject is assigned to a classification color according to the corrected color description. In embodiments of the present invention, the spectrum of human complexion colors is divided into a set of discreet classification colors. Thus, each classification color defines a subset of the spectrum of complexion colors. In embodiments of the present invention, each classification color may represent the skin color of an individual test subject (e.g., a person), an aggregate color description representing the skin color of a group of test subjects, or a color description of a reference color (e.g., of a cosmetic product, or an imaged reference color). In embodiments of the present invention, the corrected color description of the test subject may be used by a product recommendation system to classify subsequent users by their skin color. In other words, subsequent users are correlated with a subset of the spectrum of complexion colors by correlating their skin color descriptions with the complied color analysis parameter. Because the corrected color description of the test subject may be used to assign the subsequent user to a classification color, it is important that the classification color accurately represents its corresponding subset of complexion colors. By aggregating the color descriptions of a plurality of test subjects, embodiments of the present invention may reduce the influence of "outliers" and other irregularities that might skew the color description of a particular classification color. In embodiments of the present invention, based upon the corrected color description accessed in step 110, the test subject is assigned to at least one of these classification colors.

In step 140 of FIG. 1, the classification color is correlated with a prescriptive recommendation. In other embodiments of the present invention, each of the classification colors is correlated with more than one product. While the following description of an embodiment of the present invention is specifically directed to correlating a particular classification color with a cosmetic product, embodiments of the present invention are well suited for correlating a particular classification color with other appearance related products. Thus, for the purposes of the present invention, the term prescriptive recommendation means that the classification color is correlated with an appearance relate product such as makeup, clothing, frames for eyeglasses, jewelry, hair coloring etc.

In an exemplary process, a cosmetics expert is consulted who examines human test subjects and recommends a cosmetic foundation for each subject based upon the test subject's skin coloration. For example, the cosmetics expert may recommend "classic ivory" as the appropriate foundation color for a particular test subject. Thus, the test subject is associated with a classification color of test subjects whose skin color is best enhanced by a particular cosmetic product (e.g., classic ivory). In embodiments of the present invention, the cosmetic product may be available during the expert's consultation to confirm that the recommended cosmetic product is indeed well suited for that test subject's skin coloration.

Photographs of the test subject are then taken and analyzed by an image analysis system which identifies skin pixels of the test subject and determines a color description of the natural skin color of the test subject independent of the ambient lighting and image processing parameters of the image capture device that generated the picture. A skin color estimator then generates a skin color estimate of the test subject based upon an analysis of the color description of the skin pixels of the test subject. In embodiments of the present invention, multiple images of each test subject, using different image capture devices, may then be taken to test that the image analysis system and skin color estimator can work with a plurality of different camera systems. The color description of the test subject generated by the image analysis system is then used as a color description for the classification color of test subjects to whom "classic ivory" was recommended. Thus, a mapping is established between the measured color values of the test subject's skin and the recommended cosmetic product.

It is noted that embodiments of the present invention may perform the compiling of classification parameters in a different sequence than that described above. For example, the photographs of the test subjects may first be processed by the image analysis system to generate a modified image of the test subject independent of the ambient lighting and image processing parameters of the image capture equipment. This modified image may then be examined by a cosmetic expert who recommends a particular cosmetic product for that test subject. The color description of the test subject may then be generated and assigned to a classification color which is correlated with that particular cosmetic product.

In embodiments of the present invention, the skin color descriptions of a plurality of test subjects may be aggregated and the aggregated skin color description is assigned to a corresponding classification color. The variation in the differences in similarly classified test subject's appearance indicates how widely the cosmetic product can be applied. For example, the color analysis of a classification color of women who wear "classic ivory" may show that they have nearly identical skin coloration while the analysis of a classification color of women who wear "buff beige" may show a greater disparity in their skin coloration. This then indicates that the buff beige product can be more broadly applied without error. In other words, a set of domain parameters is established which describes an exemplary color description for each product. Thus, the characteristics indicative of a particular shade of cosmetics appropriate for a particular subject can be developed.

In embodiments of the present invention, the size of the classification colors may not be uniform. In other words, some classification colors may define a larger portion of the spectrum of complexion colors than other classification colors. For example, subjects with lighter complexions typically require a greater degree of granularity than subjects with darker complexions because they are trying to conceal blemishes or sun damage to their skin which are more apparent on light complexions. Conversely, subjects with darker complexions tend to want to even their skin tone rather than conceal blemishes. As a result, fewer classification colors have been found to be sufficient for subjects with darker complexions.

Embodiments of the present invention facilitate developing a set of color analysis parameters which can be used by image capture system 200 to automatically classify a subject according to an estimate of their skin color and for automatically correlating that classification with a cosmetic product. Thus, embodiments of the present invention facilitate making an automatic product recommendation based on the subject's skin color. As a result, the subject can receive a product recommendation based upon their skin color without the need for a trained consultant's analysis. This is advantageous in, for example, retail outlets which may not have the resources for providing a dedicated makeup consultation counter. Thus, if the subject purchases cosmetics from a retailer that does not have personnel trained to perform cosmetics consultations, or the space for the controlled infrastructure described above, the subject can still receive a cosmetics consultation using embodiments of the present invention.

FIG. 2 shows an exemplary image capture system 200 used in conjunction with embodiments of the present invention. In embodiments of the present invention, system 200 comprises an image capture device 201 for capturing an image 202 comprising a subject (e.g., 203) and a imaged reference color set 204. It is noted that in embodiments of the present invention, subject 203 may be a test subject as described above with reference to FIG. 1. In embodiments of the present invention, image capture device 201 does not require a controlled infrastructure when capturing image 202. For example, image capture device 201 may be a subject's personal computer system, digital camera, or a cellular telephone capable of generating photographs (e.g., referred to herein as a "picture phone"). Thus, rather than relying upon calibrated equipment (e.g., calibrated cameras and calibrated lighting), embodiments of the present invention may utilize end subject equipment during the product consultation process. Furthermore, there is no requirement for the image to be captured in an environment in which the ambient lighting conditions are known and controlled as long as the lighting conditions are sufficient for system 200 to process the image. As a result, image 202 may even be captured in a variety of environments including, for example, outdoors, or in the home of subject 203. However, embodiments of the present invention are well suited to be used in conjunction with controlled environments. Additionally, in other embodiments of the present invention, the image capture device may comprise a system of multiple image capture devices such as a stereoscopic image system.

Image 202 is then conveyed to an image analysis system 205 via network 206. As will be discussed in greater detail below, image analysis system 205 is for generating a skin color estimate 413 of subject 203 based upon an analysis of image 202. Typically, the quality and spectral characteristics of light falling on a given subject affect the subject's appearance to a camera and thus on the image generated by the camera. The camera itself, through physical characteristics of its design and fabrication of its sensor, and also through internal processing characteristics of the camera, introduces further alteration in the perceived skin coloration of the subject. These effects combine to make skin coloration metrics of the image highly dubious. By viewing a set of reference colors captured along with the image of the subject, image analysis system 205 may facilitate determining a transformation from the observed color space of the image to a reference or "true" color space that is independent of the ambient lighting conditions and image processing capabilities of the camera which captures the image.

In embodiments of the present invention, the true color space is represented by a control reference color set 208. It is appreciated that the control reference color set 208 may comprise a logical reference color set in which the spectral reflectance and color signal values of reference color set in the image are accessed, rather than an actual physical entity. By comparing the characteristics of control reference color set 208 with the characteristics of the reference color set 204 captured in the image, image analysis system 205 can determine a transformation, or "color correction function," which accounts for the discrepancy between the characteristics of imaged reference color set 204 and control reference color set 208. This color correction function directly compensates for the combined effect of the ambient lighting in the room and the color transformation of the acquiring camera.

To facilitate determining this reference transformation, image analysis system 205 detects and measures the observed characteristics of the imaged reference color set 204. Image analysis system 205 then determines a color correction function that brings colors of the imaged reference color set 204 optimally close to the colors of control reference color set 208 in the reference color space.

In order to analyze the image of a user to identify the user's skin coloration, a selection of image skin pixels in the image that are representative of the user's natural skin color is made by image analysis system 205. Selecting these elements of the user's face and head from the image to sample for color values involves identifying the location and orientation of the user's face within the image. Furthermore, a determination of where within the face to collect appropriate skin coloration measurements is made by image analysis system 205.

Image analysis system 205 may be configured to determine which regions of a user's face (e.g., the forehead, cheeks, chin, etc.) are highly predictive of the subject's overall face coloration. This ensures that coloration of the skin itself, and not freckles, blemishes, hair color, eye color, or other incorrect values, is measured. In embodiments of the present invention, techniques known to practitioners of computer vision facilitate making these determinations. For example, heads can be detected through various computer implemented "face-detection" methods and the orientation of the head can be determined through techniques such as mesh-fitting to derived control points. Samples of skin coloration can then be selected from known locations on these meshes. Alternatively, statistical analysis of skin color without mesh fitting can also be used to estimate skin coloration. Thus, image analysis system 205 does not necessarily rely upon detecting skin color in the image in order to determine the skin areas of the subject. However, image analysis system 205 may utilize computer implemented skin color detection methods in conjunction with the face-detection methods to further refine detecting the skin pixel areas of the image. These skin color detection methods identify probable skin areas based upon the colors displayed in the image.

In embodiments of the present invention, validation of the samples as being representative of the appropriate skin coloration can be performed using standard outlier rejection principles. The result is a set of skin measurements that is substantially free of defect or extraneous material and which provides a usable sampling of the subject's skin coloration. Furthermore, while the present embodiment teaches determining which regions of a user's face are representative of the subject's natural skin color, image analysis system 205 is well suited for analyzing the skin coloration of the subject's entire face, or other skin regions of the subject such the neck, arms, etc. This may also comprise excluding some areas such as the eyes, hair, facial hair, etc., which are not representative of the subject's skin coloration.

After selecting skin pixels of a user's face (e.g., the forehead, cheeks, chin, etc.) that are considered to be highly predictive of the subject's overall face coloration, image analysis system 205 determines a color description of the selected skin pixels in the image. In one embodiment, a color description of each identified skin pixel may be determined. In another embodiment, image analysis system 205 may determine an average value of all of the selected skin pixels, or some subset thereof, which have been selected.

In embodiments of the present invention, the determined color correction function is applied to the color description of one or more of the selected skin pixels located in the image. In some embodiments of the present invention, color transformation is applied to aggregate skin coloration statistics, such as the mean or median, obtained from pixels determined as likely to pertain to the subject. By applying the color correction function to the skin pixels within the image, the natural skin coloration of the subject in the color space in which the control reference color set 208 is specified. In so doing, a modified color description of that skin pixel is created which compensates for the effects of ambient lighting and image processing capabilities of the image capture device at the time the image was captured. This facilitates accurately estimating the natural skin color of the subject in the image.. In embodiments of the present invention, the color correction function may be applied to the entire capture image to create a modified image. Furthermore, determining the color correction function may be performed prior to, after, or substantially simultaneous with further processing and analysis steps (e.g., locating the skin pixels in the image).

Thus, image analysis system 205 can infer the combined effects of the ambient lighting conditions at the location at which the image is captured as well as the image processing capabilities of the image capture system. These combined effects are then substantially eliminated such that an accurate estimation of the skin color of the subject can be made based upon an analysis of the color descriptions of the subject's skin pixels. It is noted that in embodiments of the present invention, image analysis system 205 may be used to determine the color description of the at least one test subject described above with reference to FIG. 1. For example, in one embodiment, skin color estimate 413 comprises the corrected color description of the at least one test subject. In another embodiment, modified color description 209 of FIG. 4A may comprise the corrected color description of the at least one test subject.

Using image analysis system 205 is advantageous in that a controlled infrastructure (e.g., calibrated cameras and calibrated lighting or ambient conditions) is not necessary when capturing image 202. Previously, some methods relied upon a dedicated room or kiosk in which the ambient lighting conditions and the camera processing parameters were carefully calibrated. This was necessary to facilitate making an accurate assessment of the skin coloration of the subject. A picture of the subject was taken and analyzed by a human consultant who then controlled a cosmetics consultation to the subject. However, due to the expense and amount of space these facilities required, they were not generally made available to most subjects. Other systems relied upon a plurality of pictures which recorded different locations of the subject's skin or under different lighting conditions.

Returning to FIG. 2, the skin color estimate 413 generated by image analysis system 205 is then used by a product recommendation system 220 which recommends a product or products based upon the skin color of subject 203. In embodiments of the present invention, product recommendation system 220 performs a classification process in which the skin color estimate (e.g., 413) is correlated with the previously established classification colors described above with reference to FIG. 1. In embodiments of the present invention, each of the classification colors is correlated with one or more corresponding products such as cosmetics, clothing, eyeglasses, jewelry, or another appearance related product.

Product recommendation system 220 compares a color description of the skin color estimate 413 generated by image analysis system 205 with a color description of the classification colors described above with reference to FIG. 1 to determine which classification color or classification colors most closely matches the skin coloration of subject 203. In embodiments of the present invention, the classification colors may also further segment the population according to other factors such as hair color, age, and geographic location. The set of classification colors used by embodiments of the present invention may not include all people of a given population. Example data for the skin coloration and, optionally, other characteristics of people in each classification color are used to construct one or more classifiers that, when presented with the measurements for subject 203, usually assign subject 203 to a classification color or classification colors whose members closely match that of subject 203.

Embodiments of the present invention may use different types of color descriptions to construct the classification colors. For example, the classification colors may be constructed using, for each user, a description of a single point in some color space (e.g., hue-saturation-value (HSV)) that is taken to represent the overall skin coloration of subject 203. In other embodiments, this single point may be supplemented with additional points describing hair, lip, or eye color. In other embodiments, the single point may be replaced with multiple points corresponding to skin coloration at important facial or body locations (e.g., cheek, forehead, or neck). In some embodiments, the measurement may comprise an aggregate color description of a color range describing the user's skin coloration. In other embodiments, measurement data may include age, geographic location, and other non-appearance related data of subject 203.

As will be discussed in greater detail below, product recommendation system 220 may use any of a number of different types of classifiers to map the skin color estimate 413 of subject 203 to one or more of the classification colors. Once the classifiers assign a person to a classification color or classification colors based upon that subject's skin coloration measurements and, optionally, other data, skin product recommendations can be made that are well suited to people in that classification color. The different classification colors are typically associated with different skin product recommendations that are stored in, for example, a product database. This may be accomplished by using different recommendation algorithms for each classification color, different recommendation templates, or other means which allow product recommendation system 220 to automatically perform product recommendations typically performed by, for example, a makeup consultant.

Thus, product recommendation system 220 uses the skin color estimation to map subject 203 to a particular classification color or plurality of classification colors based upon the coloration of the subject. Because there is a mapping between each classification color and a range of personal appearance related products which are considered suitable for a person having that skin coloration, embodiments of the present invention can automatically generate a recommendation for subject 203 of, for example, makeup products or other appearance related products which are considered suitable for that user.

In embodiments of the present invention, subject 203 can identify additional parameters using, for example, a web interface. These parameter can be used by product recommendation system 220 to further identify the product(s) in which the user is interested. For example, users can indicate that they are interested in clothing, hair coloring, makeup, etc. The users may further indicate specific product groups in which they are interested such as eye makeup, foundation, lipstick, etc. Additionally demographic information may be collected to further refine a product consultation. For example, a teenage demographic group may prefer different styles of makeup, hair care products, etc., than are preferred by older demographic groups. Additionally, a different line of cosmetics product may also affect the selection of exemplars as some shades of foundation are sheer, while others tend to be somewhat orange or bluish.

In embodiments of the present invention, the user can specify situations which might define suitable products for that user. For example, a user seeking makeup products which can be worn in an office or professional setting might not be interested in makeup products which are considered more suitable for evening or formal occasions. Thus, in embodiments of the present invention, each expert's opinion is collected on a population of a particular region or age group, as well as the interaction of the cosmetic product with the skin colors in that region. Thus, the cosmetics expert opinion on not only the test subject's skin coloring, but also the effects of the makeup application are taken into account.

It is noted that the cosmetics expert opinion may also be applied to other appearance related products as well. For example, once a user is assigned to a classification color, the expert advisory process may also provide recommendations on lipstick, blush, eye makeup, etc. that may be suitable for the user as a member of that classification color.

In embodiments of the present invention, product recommendation system 220 may be used to convey the product recommendation directly to subject 203 or another user via a voice message, a short message service (SMS) message, a multi-media message service (MMS) message, a voice extensible mark-up language (voice XML) message, an e-mail message, an instant message, or another form of communication.

In embodiments of the present invention, image capture device 201 may comprise personal property of end subject 203 such as a picture phone, a digital camera, a personal digital assistant (PDA), a personal computer system, a digital video recorder, or a similar device capable of capturing an image. However, embodiments of the present invention may also be used in proprietary systems in which a manufacturer provides a kiosk or other automated system for providing product consultation.

In embodiments of the present invention, network 206 comprises a dial-up Internet connection, a public switched telephone network (PSTN), a high-speed network connection (e.g., cable Internet, or high-speed computer network), or the like. Alternatively, image capture device 201 may utilize a cellular telephone connection, a satellite telephone connection, a radio connection, an infra-red communication connection, or the like. However, as will be discussed in greater detail below, embodiments of the present invention do not require that image 202 be conveyed to a separate system from image capture device 201.

It is appreciated that other configurations of system 200 may be utilized in embodiments of the present invention. For example, image analysis system 205 and product recommendation system 220 may be implemented as a single system, or may each be implemented as a network of communicatively coupled devices. In embodiments of the present invention, the functionality of image analysis system 205 and product recommendation system 220 may be performed by image capture device 201, thus providing a mobile handheld product recommendation system.

Embodiments of the present invention are advantageous in that they do not need a controlled infrastructure (e.g., calibrated and controlled cameras and ambient lighting conditions) when capturing image 202, or the consultation of a trained expert to generate a product recommendation. Previously, some cosmetics manufacturers controlled a dedicated room or kiosk in which the ambient lighting conditions and the camera processing parameters were carefully calibrated. This was necessary to facilitate making an accurate assessment of the skin coloration of the user. A picture of the user was taken and analyzed by a human consultant who then controlled a cosmetics consultation to the user. However, due to the expense and amount of space these facilities required, they were not generally made available to most users.

Embodiments of the present invention do not require a controlled infrastructure because image analysis system 205 utilizes the received image of imaged reference color set 204 to compensate for the ambient lighting conditions and image processing parameters of image capture system 201. As a result, embodiments of the present invention do not rely upon calibrated cameras or calibrated lighting when capturing an image of subject 203. By performing this analysis, image analysis system 205 can then determine what adjustments are necessary so that the spectral reflectance and color signal values of imaged reference color set 204 correspond with the known spectral reflectance and color signal values of the control reference color set 209. Product recommendation system 220 can thus generate a product recommendation based upon an accurate analysis of the subject's skin color. While the present invention recites that a controlled infrastructure is not required, embodiments of the present invention may be used with a controlled infrastructure as well.

Because there is no requirement for a controlled infrastructure, or a trained consultant, embodiments of the present invention facilitate providing product consultation in retail outlets which may not have the resources for providing a dedicated consultation counter. Thus, if subject 203 purchases cosmetics from a retailer that does not have personnel trained to perform cosmetics consultations, or the space for the controlled infrastructure described above, subject 203 can still receive a cosmetics consultation using embodiments of the present invention. Additionally, the automatically generated product consultation may be marketed using the name of the cosmetics expert who assisted in compiling the color analysis parameters. For example, an advertisement in a retail outlet may say, "Get a makeup consultation from Max Factor." Thus, customers may be more likely to use system 200 to receive a cosmetics consultation from a well known cosmetics expert than from an anonymous cosmetics consultant.

Embodiments of the present invention are also advantageous in that demographic data may be accessed when compiling the color analysis parameters. For example, regional variations in cosmetics preferences may be a factor in assigning a test subject to a particular classification color. For example, there may be a different preference in the New England region of the United States regarding foundation colors than in Midwest or South. Similarly, in many Asian nations, nearly pure white foundation colors are popular with customers which are not popular in North America or Europe. Also, cosmetics preferences among discreet age groups, as well as the time day when the makeup will be worn, are factors when recommending a cosmetics product.

Because users may be more likely to buy cosmetics products from a manufacturer that provides cosmetics consultation, embodiments of the present invention are advantageous for cosmetics manufacturers who can suggest a whole range of related products and develop a relationship with subject 203 that is not possible when subject 203 is simply selecting from a shelf stocked with cosmetics products. Furthermore, users who might be uncomfortable receiving a cosmetics consultation from a total stranger could receive an anonymous cosmetics consultation using embodiments of the present invention. The product consultation may even be received by the users in the privacy of their own homes or other locations away from the retail outlets.

Figure 3:
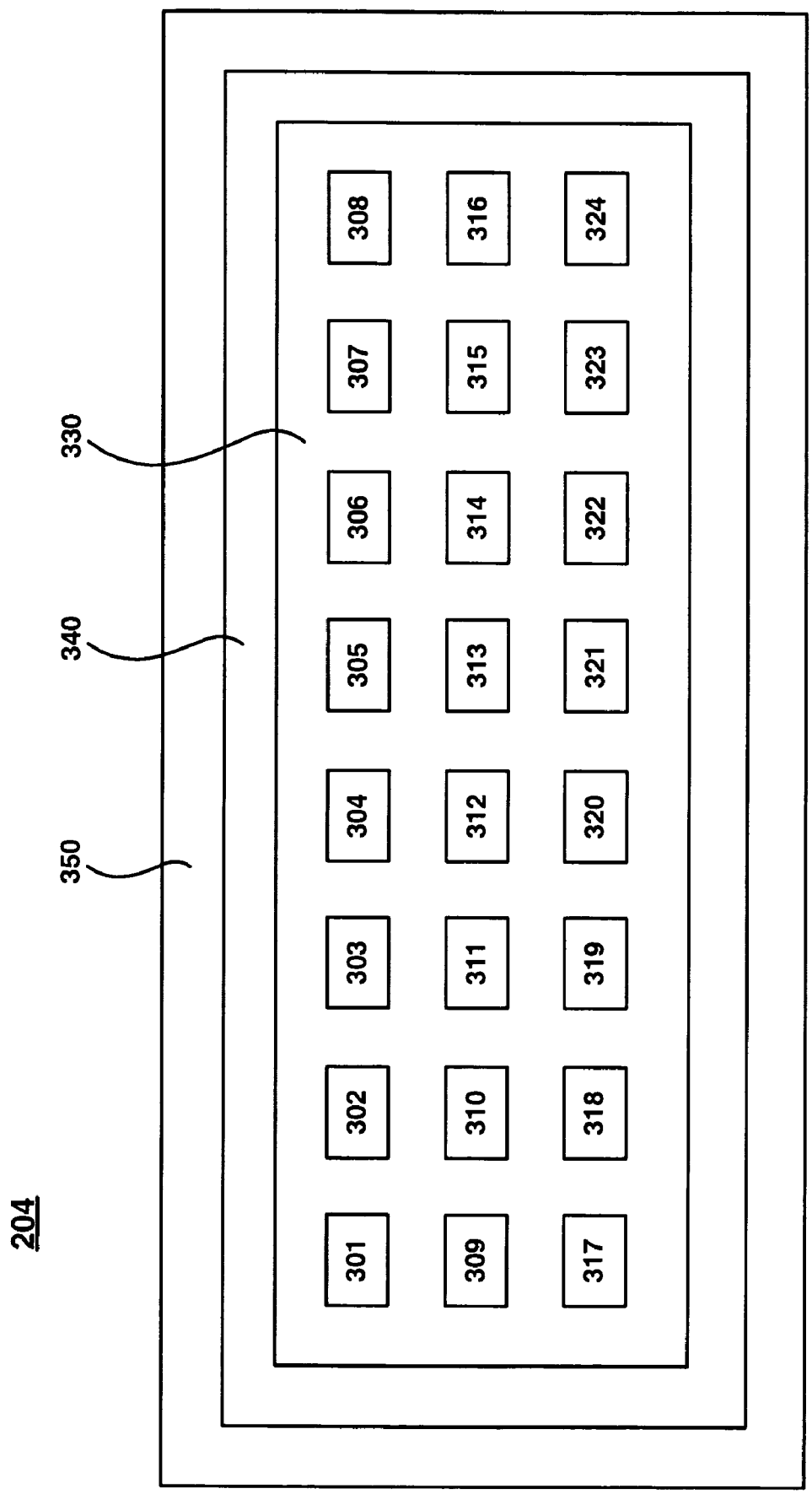
FIG. 3 shows an exemplary color reference set used in embodiments of the present invention.

FIG. 3 shows an exemplary imaged reference color set 204 used in embodiments of the present invention. It is noted that while the following discussion recites regions of imaged reference color set 204 comprising a color or colors, for the sake of clarity, these colors have been omitted from FIG. 3. In embodiments of the present invention, imaged reference color set 204 is designed for robust automatic detection by image analysis system 205.

As shown in FIG. 3, imaged reference color set 204 comprises a plurality of color patches (e.g., 301-324) which are arrayed in 3 rows of 8 color patches each. In embodiments of the present invention, color patches 301-324 are set against a black background 330 which is bounded by a white border 340 and a black border 350. In embodiments of the present invention, image analysis system 205 uses a detection algorithm to identify a pattern consistent to that produced by bounding black background 330 with white border 340. Black border 350 is used to facilitate identifying white border 340. It is noted that embodiments of the present invention are not limited to this type of pattern alone and that any detectable reference pattern arrangement may be used provided that image analysis system 205 can detect the pattern when it is present in image 202. For example, imaged reference color set 204 may comprise a checkerboard pattern, stripes, or background in which the colors represented by color patches 301-324 are embedded into wall paper, wall hangings, rugs, etc. Additionally, while FIG. 3 shows a rectangular array, color patches 301-324 may be disposed in a circular pattern, a triangular pattern, a square pattern, etc. as well. In another embodiment, imaged reference color set 204 may comprise continuous color variations over a desired color range, such as a spectrum or rainbow of colors. Sampling of colors from a continuous range may comprise sampling the entire range of colors, or sampling discreet regions of the continuous range. Additionally, while FIG. 3 shows a rectangular array, color patches 301-324 may be disposed in a circular pattern, a triangular pattern, a square pattern, etc. as well.

In the embodiment of FIG. 3, color patches 301-308 comprise primary and secondary colors for general scene tone balancing and two shades of gray for white balancing. Color patches 309-324 comprise sixteen color patches representative of a range of human skin colors. In embodiments of the present invention, the color descriptions of control reference color set 208 are known to image analysis system 205 and are used as the reference or "true," color space, independent of lighting and image capture device characteristics, to which imaged reference color set 204 is compared. For example, in one embodiment, the spectral reflectances of each color patch (e.g., 301-324) is measured and then approximated as a 3-component standard red, green, blue (sRGB) encoded digital value. These encoded signal values are then compared with the corresponding 3-component signal values of control reference color set 208. It is noted that in embodiments of the present invention, the color patches (e.g., 301-324) shown in reference color set 204 may also comprise the classification colors (e.g., 221) which are used to correlate subject 203 with a class.

Figure 4A:
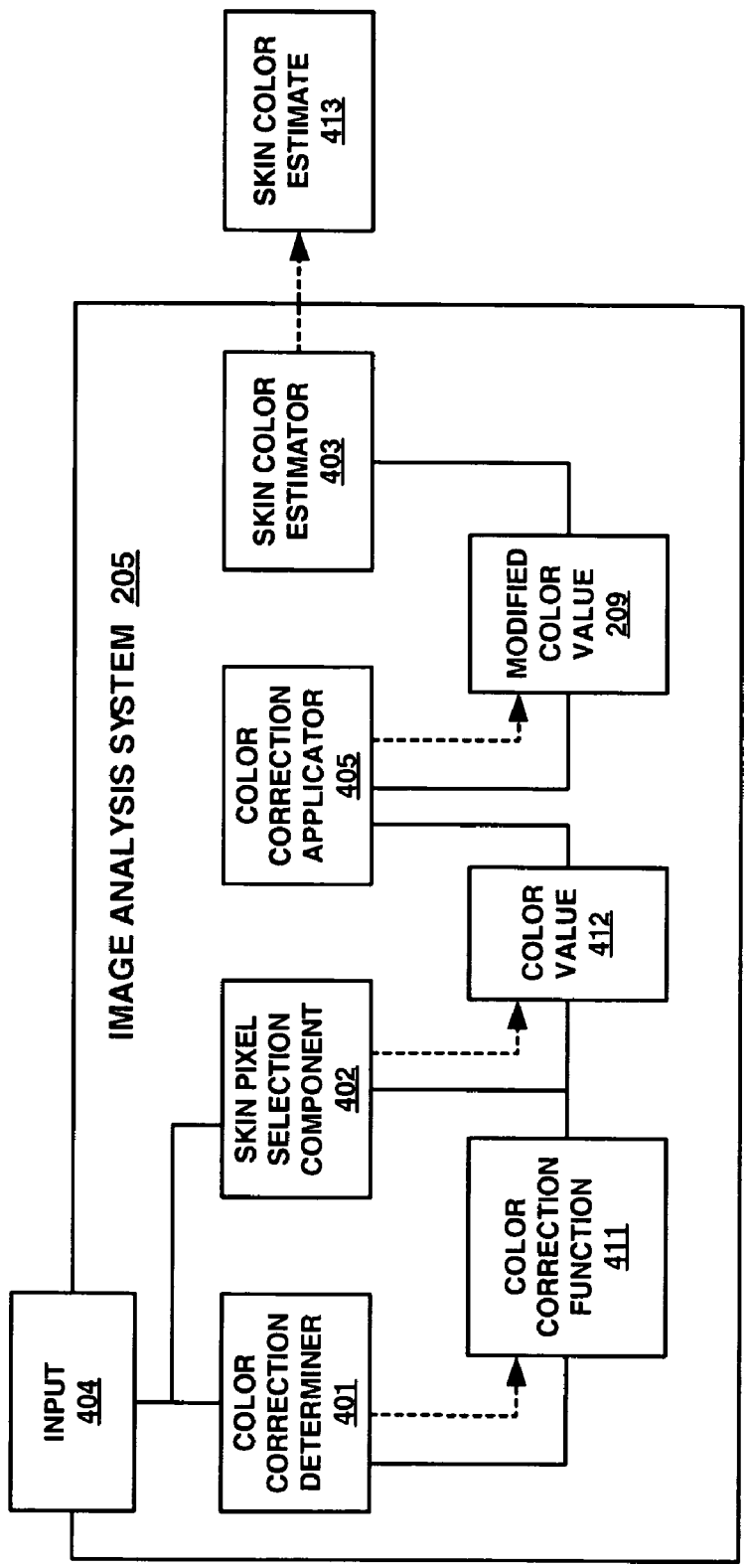
FIG. 4A is a block diagram of a categorizing system for generating a skin color estimate in accordance with embodiments of the present invention.

FIG. 4A is a block diagram of a image analysis system 205 used in accordance with embodiments of the present invention. In embodiments of the present invention, image analysis system 205 comprises an input 404, a color correction component 401, and a skin pixel selection component 402, an applicator 405, and a skin color estimator 403. In the embodiment of FIG. 4A, an image 202 is received by input 404 and sent to color correction component 401 and skin pixel selection component 402. Then, a color correction function 411 is output from color correction component 401 while skin pixel selection component 402 identifies at least one skin pixel from image 202 to which color correction function 411 will be applied by applicator 405. As a result of applying the color correction function 411 to the identified skin pixel(s), a modified color value 209 is output to skin color estimator 403 which generates a skin color estimate 413 based thereon. In embodiments of the present invention, image 202 is received as an input to color correction component 401 and skin pixel selection component 402. As described above, the step of determining a color correction function may precede, follow, or be performed substantially simultaneous to the step of locating a plurality of skin pixels from image 202.

In embodiments of the present invention, color correction component 401 performs an automatic detection of a target pattern (e.g., imaged reference color set 204). In an exemplary target detection sequence, a monochrome (e.g., a luminance only) version of the color image is filtered using, for example, a Laplacian filter. This determines the locus of maximal brightness change in the image (e.g., between the color patches 301-324 and background 330, or between white border 340 and black border 350). The locus of zero-crossing positions observed in the Laplacian output are then connected, where possible, into a set of closed contours. Each of the closed contours is then approximated by a sequence of linear segments, which may be determined through a successive bisection operation based on deviation of the contour from a straight line. "Rectangle candidates" are accepted for those contours whose segmentation (as above) results in four major pieces whose relationships are consistent with the projection of a planar rectangle (i.e., opposing sides are consistent with being parallel and adjacent sides are consistent with being orthogonal). In one embodiment, a contour "rectangle candidate" is located whose contrast is indicative of a darker exterior (e.g., black border 350) and lighter interior (e.g., white border 340). Then, a contour "rectangle candidate" is located inside the above contour whose contrast is indicative of a lighter exterior (e.g., white border 340) and a darker interior (e.g., black background 330).

In embodiments of the present invention, it is then determined if the above contour (e.g., the edge of black background 330) contains a set of "rectangle candidate" contours (e.g., color patches 301-324) whose contrasts are indicative of lighter interiors set inside a darker exterior. For example, each of color patches 301-324 is lighter than the black background 330 in which they are positioned. A determination is made of the transformation that maps the outer two "rectangle candidate" contours (e.g., black border 350 and white border 340) to true rectangles of correct aspect and relationship based upon the known values of these contours from the reference target description. In the present embodiment, it is then determined whether the interior contours (e.g., of color patches 301-324) are also of the correct aspect and at consistent locations when transformed by the above transformation (based upon the known values of the contours of the color patches). In embodiments of the present invention, if a sufficient number of such interior color patches are determined (e.g., a suitable measure of "sufficiency" might be 90%), then accept the reference target as being detected. It is noted that some of the color patches may have contrast values that inhibit their detection in a given image 202. In embodiments of the present invention, the color values inside the above-detected and validated color patches are sampled and a selection of them may be used to determine target orientation, then all are used as the sample values for establishing the true-color transformation performed by image analysis system 205. Because the orientation of imaged reference color set 204 may be ambiguous in some situations when strictly using the geometry rectangle measures, orientation of imaged reference color set 204 may be determined by assessing the arrangement of the color patches 301-324 themselves. In other embodiments, distinctive markings (e.g., a geometric pattern, or a geometric pattern of color patches 301-324) may reveal the orientation of imaged reference color set 204 through their shape or relationships.

In embodiments of the present invention, color correction component 401 validates the imaged reference color set 204 upon detection to ensure the fidelity of color patches 301-324 in image 202. For example, if color patches 301-324 fade, or become discolored due to staining, the results of sampling the color patches by image analysis system 205 may become skewed. As a result, an incorrect estimation of the color correction function 411 by color correction component 401 may result. Thus, in embodiments of the present invention, color correction component 401 may validate the age or version of imaged reference color set 204. For example, imaged reference color set 204 may comprise a pattern (e.g., a barcode), symbol, or character string (e.g., the date imaged reference color set 204 was printed) that is recognizable to image analysis system 205 and can be used to determine whether the imaged version imaged reference color set 204 is still valid. Alternatively, one or more of the inks used to create imaged reference color set 204 may be selected to fade after a given amount of time. As a result, portions of imaged reference color set 204 may become unrecognizable to color correction component 401 which prevents further estimation of the skin color from the received image 202. In another embodiment, fading of one or more of the inks may cause a message to be displayed which tells subject 202 that imaged reference color set 204 has expired and that a new version will be needed to generate an accurate skin color estimate 413.

In embodiments of the present invention, upon determining that the imaged reference color set 204 is a valid copy, color correction component 401 then estimates the color transformation between the color space of image 202 and the control reference color set 208 to determine color correction function 411. In one embodiment of the present invention, a least-squares estimation of a 3×4 matrix to derive a color correction function F(, also referred to as a "transform function" that maps measured patch mean colors M(e.g., from one or more of color patches 301-324) from imaged reference color set 204 to a corresponding control color values R in control reference color set 208. For example, an estimation that maps the measured patch mean color for color patch 301 to the control color value for that color patch (e.g., in control reference color set 208) results in a transform value F( (e.g., color correction function 411). This method provides a 3×3 color transformation plus a per-color-component offset. In embodiments of the present invention, prior to performing the least-squares estimation, patch mean colors with at least one saturated component are excluded, and the sRGB color component function is inverted for both M and R. In other embodiments, the measured patch mean color values may be processed through an inverse-gamma function to remove the effects of device non-linear contrast adjustment. However, while a 3×4 matrix may be used to determine the color correction function, embodiments of the present invention are not limited to linear algebra to determine this function. In other words, the color correction function can take any functional form.

In embodiments of the present invention, all of the color patches from imaged reference color set 204 may be measured and used to determine the value of F((e.g., color correction function 411). In another embodiment, the color patches may be selectively sampled. For example, in one embodiment, only the color patches (e.g., 301-308) of the base colors (e.g., blue, green, red, cyan, magenta, yellow, and two gray shades) are used to determine F(. Embodiments of the present invention may also sample white tones from white border 340 and black tones from background 330 or black border 350. In another embodiment, all of the skin colored patches (e.g., color patches 309-324) as well as black, white, and gray tones are sampled in order to determine F(. In another embodiment, only the skin colored patches (e.g., color patches 309-324) are sampled to determine F(. In embodiments of the present invention, it may be advantageous to only sample the skin colored patches (e.g., color patches 309-324) in order to determine a color correction function best suited for estimating the skin color of subject 203. For example, sampling all of the imaged color patches from imaged reference color set 204 may result in a F( value that is best suited for correcting the colors of the overall image, but is not necessarily best suited for correcting the imaged skin color of subject 203. Thus, dense sampling of the color region of interest (e.g., skin tones) may be more important than a broad sampling of the overall color space when estimating the skin color of subject 203.

Thus, color correction component 401 determines a color correction function F((e.g., 411) which substantially eliminates discrepancies between the imaged reference color set 204 and the control reference color set 208. This can be expressed by the equation:

$$I\_R = F(I\_C)$$

where I_R is a color in control reference color set 208 and I_C is a corresponding color from imaged reference color set 204. This results in color correction function 411, which, when applied to image 202, accurately conveys the colors of image 202 by compensating for the effects of ambient lighting conditions and the image processing capabilities of image capture device 201. More specifically, after color correction function 411 is applied to the skin pixels identified in image 202, the skin color of subject 203 can be determined without the distorting effects of ambient lighting conditions and the image processing capabilities of image capture device 201. It is noted that color correction 411 may only be approximate. For example, the value of F(may not map each of an acquired image color from imaged reference color set 204 to its exact corresponding reference color in control reference color set 208. Furthermore, it is appreciated that F(may lack the degree of precision necessary to cause an exact match between a reference color in control reference color set 208 when applied to the corresponding color in imaged reference color set 204. For the purposes of the present invention, the phrase "substantially eliminates" means that, after F(has been applied to pixels of image 202 (e.g., or color descriptions thereof), the difference between the natural skin color of subject 203 and the corrected skin color of subject 203 represented by modified color description 209 are not readily discernable.

Figure 5:
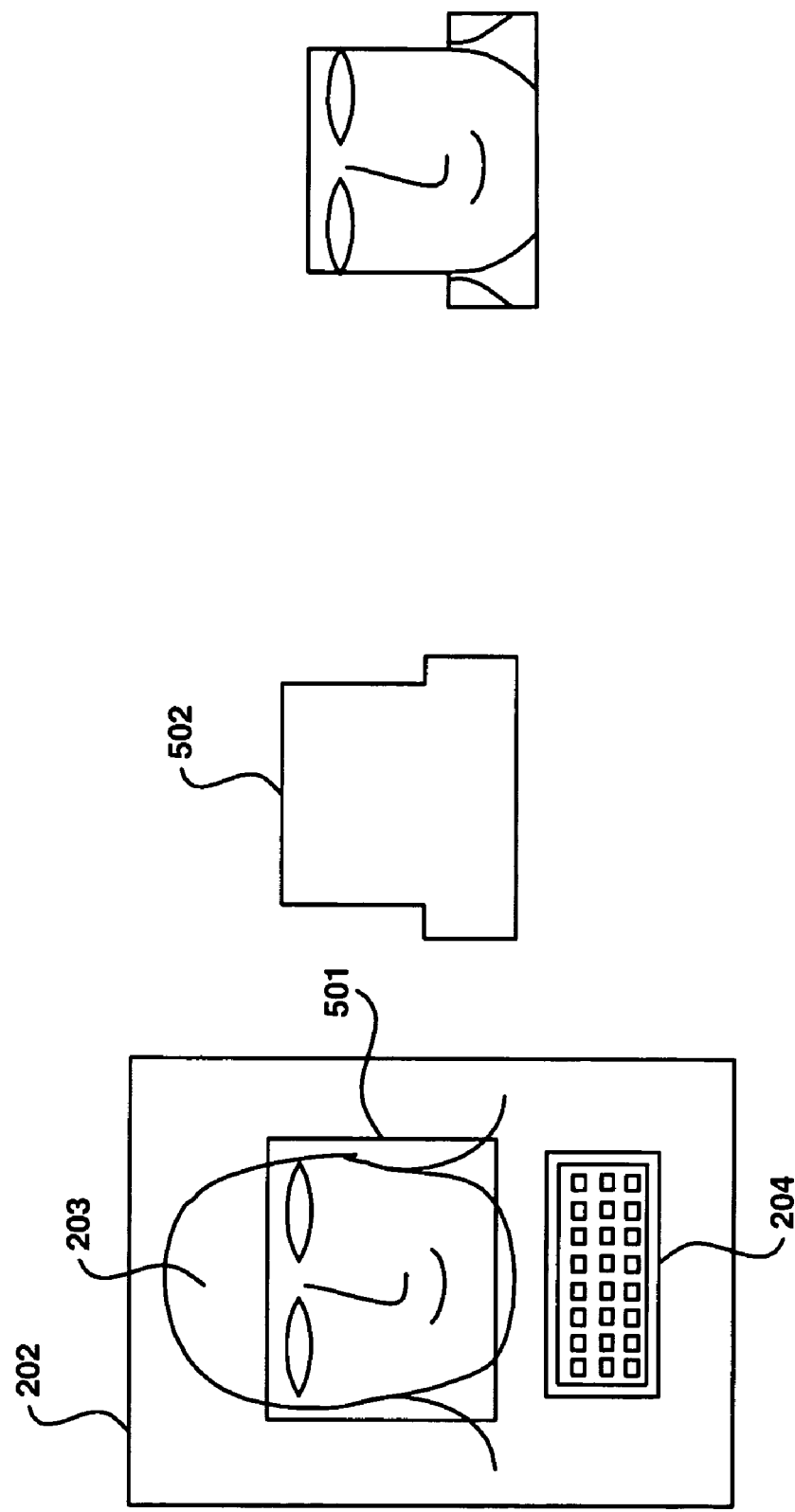
FIG. 5 shows exemplary steps in selecting skin pixels in accordance with embodiments of the present invention.

FIG. 5 shows exemplary steps in selecting skin pixels in accordance with embodiments of the present invention. Skin pixel selection component 402 is for identifying pixels in image 202 that are likely to correspond to skin regions of subject 203 and particularly to those regions which are likely to be representative of the natural skin color of subject 203. As discussed above, some people's skin may be blemished, shiny, sun tanned/burnt, freckled, or in some manner discolored from that person's natural skin color. Furthermore, when image 202 is captured, the ambient lighting may cause shadows or highlighted areas which are not representative of that person's natural skin color. Additionally, regions of image 202 which show the hair or eyes of subject 203 should be eliminated from analysis by categorizer 205 when estimating the skin color of subject 203. In embodiments of the present invention, skin pixel selection component 402 divides the step of identifying likely skin pixel areas of image 202 into two parts: finding the face of subject 203, and sampling the face to find a region that is relatively unaffected by blemishes, shadow, or other coloration irregularities.

In embodiments of the present invention, skin pixel selection component 402 utilizes face pattern detection algorithms to identify likely regions of image 202 which comprise the face of subject 203. Typically, it is likely that subject 203 will be the only, or the most prominent face shown in image 202. Thus, embodiments of the present invention may utilize a C++ implementation of the Viola-Jones face detector, applied at 24 resolutions, with lenient detection thresholds and, if necessary, image rotation. In embodiments of the present invention, if multiple regions are identified that are likely to be the face of subject 203 (e.g., multiple faces in image 202), skin pixel selection component 402 will select the largest region that has been identified as a likely face region for processing. It is noted that embodiments of the present invention may also utilize skin color detecting algorithms to further refine the identification of likely skin regions of subject 203. In embodiments of the present invention, the region of image 202 identified by the face detection algorithm is bounded by a face bounding box (e.g., 501 of FIG. 5) imposed on the image 202.

In embodiments of the present invention, skin pixel selection component 402 applies a binary "face mask" template (e.g., 502 of FIG. 5) within face bounding box 501. This is applied because the location of facial features within face bounding box 501 is typically not constant across all images 202. Thus, face bounding box 501 typically includes non-face background and non-face features of subject 203. As discussed above, ambient lighting and hair can also cause shadows to fall on any part of the face of subject 203, and skin texture is well known to produce large regions of specularities. Thus, in embodiments of the present invention, template 502 isolates skin regions which have a high probability of being representative of the natural skin color of subject 203 without detailed parsing of the facial features and without segmentation of the face from the background.

As shown in FIG. 5, template 502 excludes outer regions shown in face bounding box 501 such as the hair, and forehead of subject 203, as well as most of the background of image 202. However, template 502 is extended somewhat in the lower region to emphasize the sampling of skin pixels in the cheek regions of subject 203. In another embodiment, explicit detection of facial features such as the eyes, nose, and mouth of subject 203 is performed followed by pixel selection of regions defined relative to these detected features. It is noted that the above description is only one way in which the face pixels of image 202 are detected and that there are a variety of other well known facial feature detection methods known in the art that may be utilized in accordance with embodiments of the present invention.

In embodiments of the present invention, the pixels remaining within template 502 are then sorted by luminance. It is noted that there are a variety of methods for computing luminance in accordance with embodiments of the present invention. In one embodiment, luminance (Y) may be computed using the following formula:

$$Y = R + G + B$$

where R, G, and B are the red, green, and blue values of each pixel remaining in template 502. Having computed the luminance of each pixel, skin pixel selection component 402 sorts the pixels, based upon their luminance. Skin pixel selection component 402 then eliminates skin pixels that have a luminance below a lower threshold and skin pixels that are above an upper threshold. This excludes high-end specularities (e.g., shiny skin) whose luminance typically falls above the upper luminance parameter. This also excludes pixels corresponding with the hair, nostrils, mouths, and shadowed portions of the subject's face which are typically associated with low luminance values that fall below the lower luminance parameter.

In one embodiment, the remaining pixels are clustered according to color in the control reference color set 208. Then, pixel clusters in probable skin color ranges are identified using a model of skin color that applies over a wide range of image capture and lighting conditions. In one embodiment, the largest cluster of skin color pixels is selected as being representative of the skin color of subject 203. In another embodiment, the cluster having the greatest density is selected. Again, it is noted that the identification of skin pixels within image 202 can be performed independently from the color correction estimation described above. Thus, in embodiments of the present invention, identification of skin pixels within image 202 may be performed prior to, subsequent to, or substantially simultaneous with the color correction estimation described above with reference to the discussion of FIG. 4A.

In embodiments of the present invention, upon identifying skin pixels within image 202 that are most likely to represent the natural skin color of subject 203, a measurement of the skin color descriptions of those pixels is made. In embodiments of the present invention, the color description of the identified skin pixels may comprise individual color values such as a three-component vector in an RGB space. In other embodiments of the present invention, aggregate color descriptions of the identified skin pixels may be used. Examples, of aggregate color descriptions used in embodiments of the present invention may include, but are not limited to, the mean and co-variance of a multi-dimensional Gaussian function that fits a collection of individual color samples. Another example may be the bounds of a range in some color space. In another embodiment, the aggregate color description may be considered a classification color.

In the embodiment of FIG. 4A, applicator 405 receives color correction function 411 from color correction component 401 and the color descriptions (e.g., 412) of the skin pixels selected by skin pixel selection component 402 as being representative of the skin color of subject 203. In one embodiment, applicator 405 then applies color correction function 411 to the color descriptions 412 and outputs modified color description 209 as a result. In another embodiment, the function of applicator 405 may be performed by color correction component 401, skin pixel selection component 402, or skin color estimator 403.

In embodiments of the present invention, modified color description 209 is accessed by skin color estimator 403 which then generates a skin color estimate 413 of subject 203 based upon an analysis of modified color description 209 in the control reference color set 208. As described above, in modified color description 209 the effects of ambient lighting and image processing capabilities of image capture device 201 which may have been existing at the time image 202 was captured have been substantially eliminated. In embodiments of the present invention, the skin color estimate 413 may comprise a single vector having the same dimension as the control reference color set 208. In another embodiment, skin color estimate 413 may comprise a probability distribution over values in control reference color set 208. In another embodiment, a probability is generated with each skin color estimate 413 generated by image analysis system 205. In another embodiment, an averaging of the skin pixel descriptions, with optional weights, may result in a single skin color estimate 413. The optional weights may be determined in part by the likelihoods of individual skin pixels being located at good image sampling locations for skin, where these likelihoods are determined by skin pixel selection component 402. It is noted that skin color estimate 413 may not comprise a single skin color, but may refer to a color class or range of skin colors.

Figure 4B:
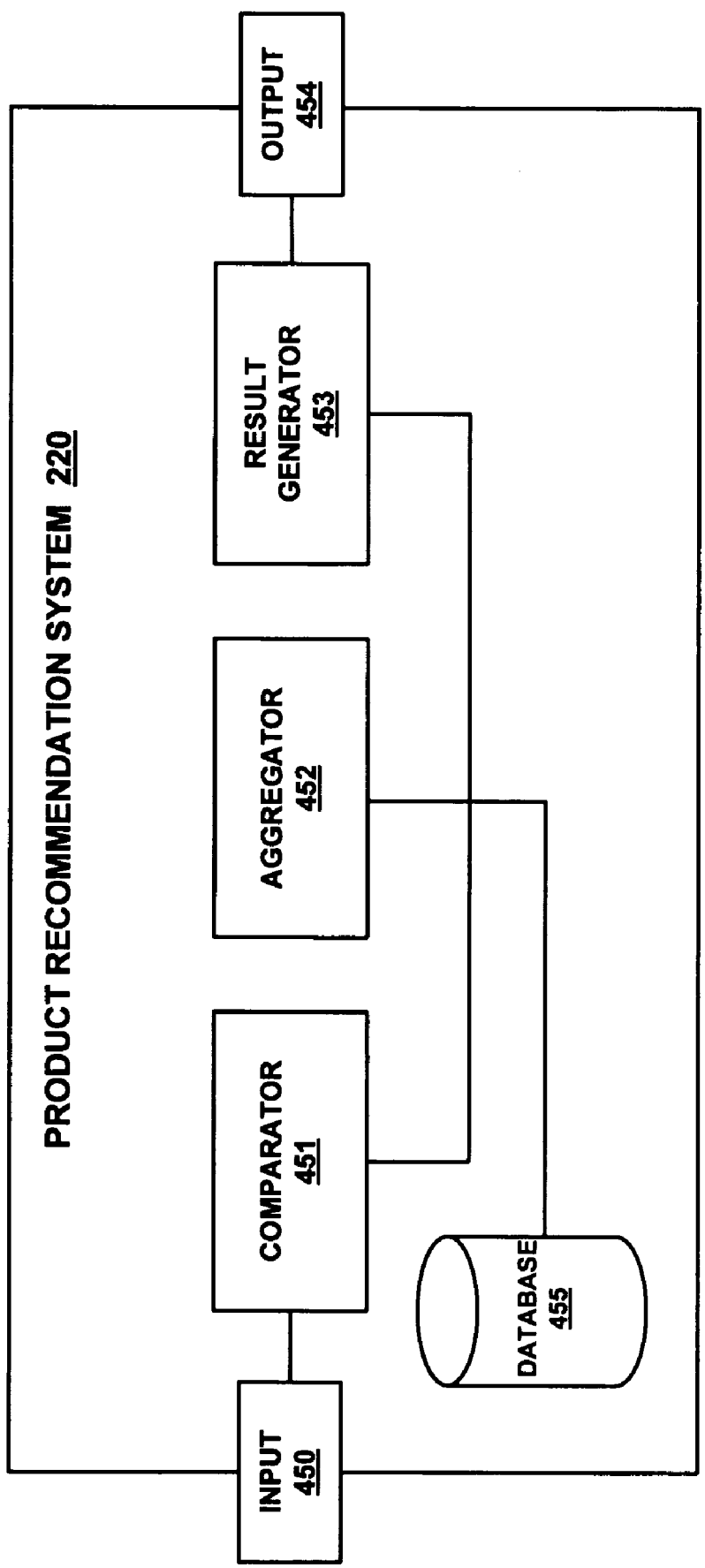
FIG. 4B is a block diagram of a product recommendation system for recommending a product based upon the skin color of a subject in accordance with embodiments of the present invention.

FIG. 4B is a block diagram of a product recommendation system 220 in accordance with embodiments of the present invention. As described above with reference to FIGS. 1 and 2, product recommendation system 220 automatically generates a product recommendation based upon the subject's skin color estimate received from image analysis system 205. In the embodiment of FIG. 4B, product recommendation system 220 comprises an input 450 coupled with a comparator 451, an aggregator 452, a result generator 453, a database 455 and an output 454. Skin color estimate 413 is accessed by comparator 451 via input 450 which compares skin color estimate 413 with at least one classification color (e.g., 221 of FIG. 2). In embodiments of the present invention, the comparator 451 selects a classification color whose color description most closely matches the color description of skin color estimate 413. Based upon this selection, a correlation (e.g., stored in database 455) is accessed which correlates the selected classification color with at least one product. Result generator 453 then generates a recommendation of that product which is output by output 454. In embodiments of the present invention, output 454 may be communicatively coupled with network 206 or another communication network which conveys the product recommendation to the user of system 200. As described above, the user may be subject 203 or an operator of system 200.

In embodiments of the present invention, the reference color accessed by comparator 451 is one of a plurality of reference colors 221 which comprise, but are not limited to, a range of human skin colors. For example, estimates of the skin color of a set of "training" subjects may be used as the reference colors 221. In other words, a measurement of the skin colors of a group of test subjects is followed by a classification of those skin colors into groups or classification colors. In embodiments of the present invention, this may be performed using system 200. In other embodiments, the skin color of the training subjects may be manually specified, or measured using a spectrophotometer or another device. The individual reference color descriptions may have a plurality of different meanings. For example, a reference color may represent a skin color estimate of a subject obtained in the past for a different person, or for the same subject. Alternatively, it may represent the color of a patch on a reference color chart, of a known object, or the mean of a pre-defined color range. In other embodiments of the present invention, the reference color may represent the color of a product that may be recommended by product recommendation system 220.

As described above with reference to FIG. 2, in embodiments of the present invention classification is a process in which the spectrum of complexion colors is divided into a set of discreet classification colors. Thus, each classification color defines a subset of the spectrum of complexion colors. In embodiments of the present invention, each classification color may represent the skin color of an individual training subject, or a aggregate color description representing the skin color of a group of training subjects. By aggregating data into groups prior to skin color comparison, embodiments of the present invention may reduce the influence of "outliers" and other irregularities in the training data that may skew the results of the comparison and thus cause poor recommendations to be made in some cases.

Additionally, in embodiments of the present invention, the skin color of each subject 203 who uses system 200 may be subsequently added to the group of training subjects as a reference color that aids in making a product recommendation for this same subject 203 or some other person. As described above, reference colors 221 may also represent colors of non-human objects such as clothing, cosmetic products, etc. In another embodiment, reference colors 221 may represent the color patches (e.g., 301-324) on a imaged reference color set 204, or another color reference chart. However, in general it is not necessary for reference colors 221 to have any particular meaning. That is, they may be equally spaced colors in a selected (e.g., manually or automatically) color space.

In embodiments of the present invention, comparator 451 accesses a color description of skin color estimate 413 and of reference colors 221. In embodiments of the present invention, the color descriptions may comprise individual color values or aggregate color descriptions. An individual color value may be described as a representation of a single color, such as a three-component vector in a RGB (red-green-blue) space. Aggregate color descriptions refer to ranges or distributions of color values in some color space. As an example, an aggregate color description may be the mean and co-variance of a multi-dimensional Gaussian function that is applied to a plurality of individual color samples. Another example of an aggregate color description is the bounds of a range in some color space. In embodiments of the present invention, an aggregate color description may be considered a classification color.

In embodiments of the present invention, other data may be collected together and associated with each of the reference color descriptions. For example, aggregator 452 may group classification colors of reference colors 221 based upon some criteria. In one embodiment, a classification color of reference colors 221 may be based upon the skin color of the set of training subjects. In another embodiment, a classification color of reference colors 221 may be based upon a product recommendation. That is, the color description of skin color estimate 413 is compared with a color description of a product rather than with a color description of a training subject. Additionally, in embodiments of the present invention, an association of a subjects skin color estimate with a product recommendation may be stored and used as a training step for product recommendation system 220. Thus, when a similar skin color estimate is subsequently accessed, the previous comparison can be used as an aid in determining a product recommendation.

In embodiments of the present invention, comparator 451 generates a "difference value" which describes the degree of similarity between the color description of skin color estimate 413 and a reference color 221. Many different comparison methods may be used in embodiments of the present invention depending upon whether the color descriptions of skin color estimate 413 and a reference color 221 are individual color values or aggregate color descriptions. Comparisons may be done even when the color description of skin color estimate 413 is an individual color value and the color description of a reference color 221 is an aggregate color description, or vice versa. For comparison between individual color values, a standard method for comparison of multivariate data may be employed such as L1, L2, and infinity norms, and simple differencing (subtraction). For comparison between an individual color value and an aggregate color description, of Gaussian form, the Mahalanobis distance is one suitable metric. To compare two aggregate color descriptions, represented as probability distributions in some space, the Kullback-Leibler divergence is often an appropriate metric. To compare aggregate color descriptions represented as Gaussian distributions, the distance between the means may be used, optionally with scaling determined by the Gaussian variances. For aggregate descriptions represented as histograms, any of the histogram comparison methods commonly known in the art may be used.

In some embodiments of the present invention, a set of reference colors 221 are descriptions of color "classification colors" and the color comparison step (e.g., 120 of FIG. 1) is comprised of classification of skin color estimate 413 by at least one classifier (e.g., by comparator 451). In embodiments of the present invention, the "difference values" produced in this comparison step are decisions of classification color membership, or probabilities of classification color membership, or both, with respect to some set of reference classification colors. A decision of classification color membership may be regarded as a specific case of classification color membership probability estimation, in which the estimated probability of classification color membership is always, for example, a 1 or 0 depending on whether the color (e.g., skin color estimate 413) is judged to be, or not be, respectively, a classification color member. Skin color estimate 413 may be judged by the same classifier (e.g., comparator 451) to be a member of multiple reference classification colors, or it may be determined as not belonging to any of the reference classification colors. If skin color estimate is judged to be a member of multiple reference classification colors, additional information such as a probability estimation, or a difference value corresponding to each of the reference classification colors may be appended.

In embodiments of the present invention, classification color memberships, and probabilities thereof, may be computed by multiple classifiers with respect to a single pre-defined set of reference classification colors, or by multiple color classifiers with respect to multiple sets of pre-defined reference classification colors. A variety of classifiers may be used in accordance with embodiments of the present invention including those commonly referred to in the mathematical and computer science arts as neural networks, support vector machines, linear discriminants, Gaussian models, decision trees, Multivariate Adaptive Regression Splines (MARS) classifiers, Classification and Regression Tree (CART) classifiers, and nearest-neighbor classifiers. In embodiments of the present invention, the classifiers may be constructed via standard training, or other methods, prior to use in classification.

In one embodiment, training set product recommendations associated with reference colors similar to skin color estimate 413 are given higher weight in constructing the resulting product recommendation. For example, the difference values may be converted via a pre-defined function to numerical values or weights that are higher for lower difference values, and then the numerical representations of the training set product recommendations are combined as a weighted sum using these weights. The sum is then divided by the total of the weights, with the recommendation corresponding to the resulting vector value being used as the result product recommendation. An example of such a mathematical function may be described procedurally as follows:

Convert the N color difference measures into class weights via a pre-defined function,
Convert the product recommendation frequencies within each of the N classes selected into "recommendation weights" via a pre-defined function,
Multiply the recommendation weights by the corresponding class weights to produce "final weights",
Compute a weighted sum over all the product recommendations associated with the N classes selected using the final weights;
Divide by the sum of the final weights to obtain a numerical representation of the product recommendation.

In other embodiments, other mathematical procedures or rules-based methods are applied to obtain the product recommendation using the N class difference measures, the associated product recommendation statistics for each of these classification colors, or both.

In embodiments of the present invention, once a difference value or classification result is determined, at least one product recommendation is made automatically by product recommendation system 220. In embodiments of the present invention, other information may be accessed as well to determine which product should be recommended. For example, current fashion preferences and individual customer preferences, as well as the age or ethnicity of subject 203 may affect the determination of a product which is to be recommended.

The actual decision process may be made by a variety of methods, including ones well known in the arts of mathematics and computer science based on sets of rules. In one embodiment, the product recommendation is made by applying at least one classifier to the differences values (e.g., obtained in step 120 of FIG. 1) between the reference colors 221 and skin color estimate 413. In another embodiment, the product recommendations are associated with the reference colors 221 and these product recommendations may be represented as a numerical vector is some space. The resulting product recommendation may then be the result of a pre-defined mathematical function applied to these vectors, optionally also making use of the color difference values described above.

Figure 4C:
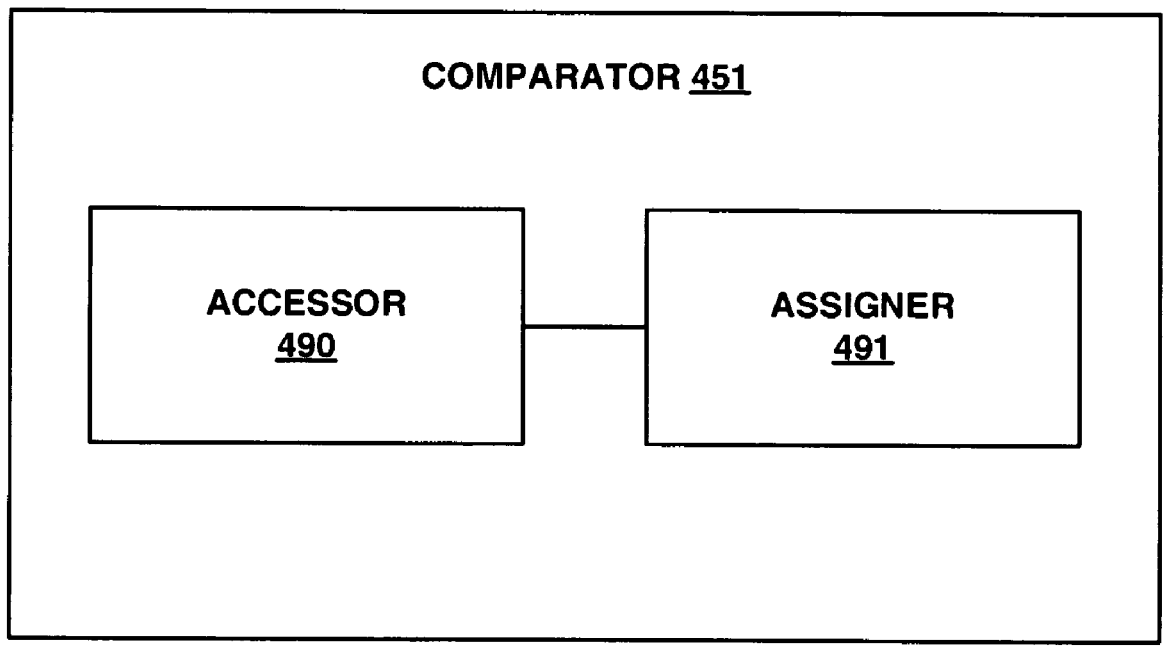
FIG. 4C is a block diagram of an exemplary system for compiling color analysis parameters in accordance with embodiments of the present invention.

FIG. 4C is a block diagram of an exemplary system for compiling color analysis parameters in accordance with embodiments of the present invention. In the present embodiment, an accessor 490, coupled with an assigner 491, are components of comparator 451. However, it is noted that in other embodiments, accessor 490 and assigner 491 may be separate components, or sub-components of, for example, aggregator 452. In embodiments of the present invention, accessor 490 is for accessing a color description of a test subject 203. Assigner 491 is for assigning the test subject (e.g., 203) to a classification color 221 according to the color descriptions of both test subject 203 and classification color 221. It is noted that the process for assigning a color description of a test subject to a classification color is similar to that described above with reference to FIG. 4B. Embodiments of the present invention facilitate developing a set of color analysis parameters which can be used by image capture system to automatically classify a subject according to an estimate of their skin color and for automatically recommending a cosmetic product based upon that classification.

Figure 4D:
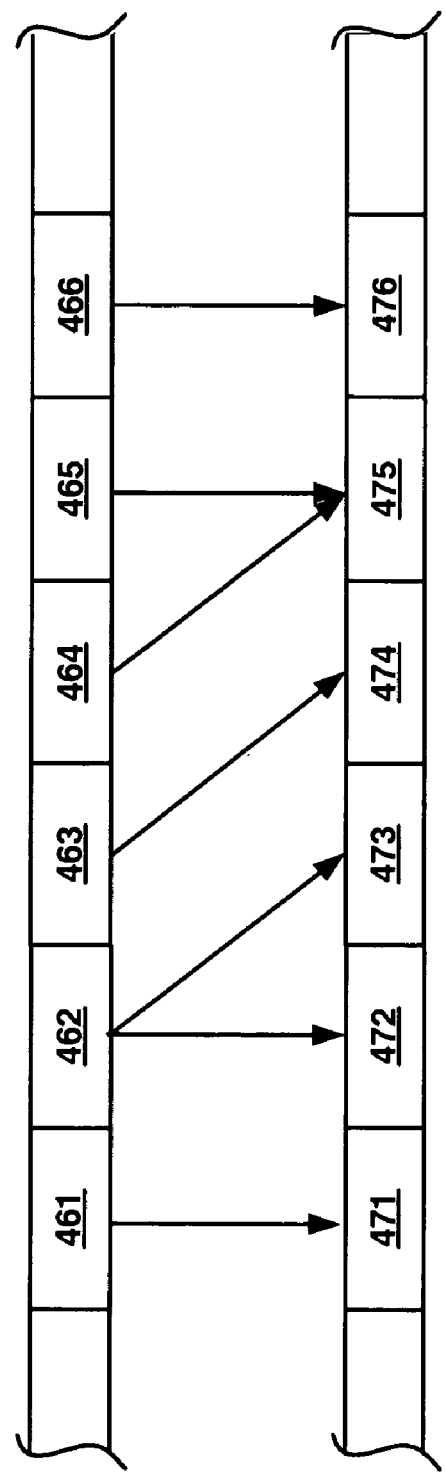
FIG. 4D shows exemplary correlations between reference colors 221 and products in accordance with embodiments of the present invention.

FIG. 4D shows exemplary correlations between reference colors 221 and products in accordance with embodiments of the present invention. In embodiments of the present invention, correlations between reference colors, or classification colors, and one or more products are stored in database 455. As shown in FIG. 4C, a plurality of reference colors (e.g., 461, 462, 463, 464, 465, and 466) are correlated with corresponding products (e.g., 471, 472, 473, 474, 475, and 476). It is noted that there in not necessarily a one-to-one correspondence between a reference color and a particular product. That is, in some cases, a reference color (e.g., 462) may be associated with more than one product (e.g., 472 and 473). Similarly, a given product (e.g., 475) may be associated with more than one reference color (e.g., 464 and 465). It is appreciated that the association between a reference color and a product may be performed as described above, or may be established manually in embodiments of the present invention. Similarly, it is noted that the reference colors (e.g., 461, 462, 463, 464, 465, and 466) may comprise individual color values, aggregate color values, or encompass a range of color values in accordance with embodiments of the present invention.

Figure 6:
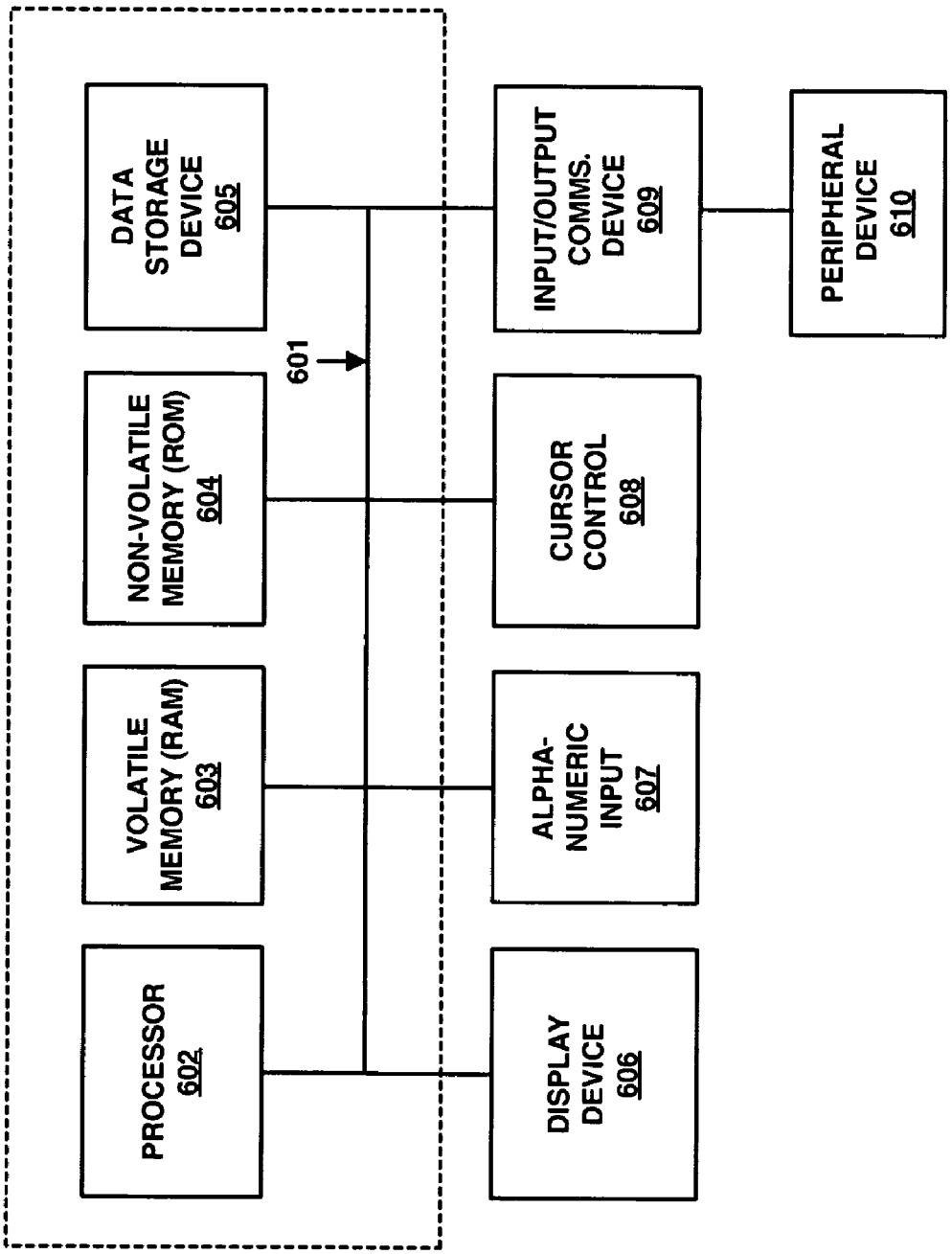
FIG. 6 is a block diagram of an exemplary computer system upon which embodiments of the present invention may be implemented.

FIG. 6 is a block diagram of an exemplary computer system 600 upon which embodiments of the present invention may be implemented. In embodiments of the present invention, portions of the present invention are comprised of computer-readable and computer-executable instructions that reside, for example, in computer system 600 which is used as a part of a general purpose computer network (not shown). It is appreciated that computer system 600 of FIG. 6 is exemplary only and that the present invention can operate within a number of different computer systems including general-purpose computer systems, embedded computer systems, laptop computer systems, hand-held computer systems, and stand-alone computer systems.

In the present embodiment, computer system 600 includes an address/data bus 601 for conveying digital information between the various components, a central processor unit (CPU) 602 for processing the digital information and instructions, a volatile main memory 603 comprised of volatile random access memory (RAM) for storing the digital information and instructions, and a non-volatile read only memory (ROM) 604 for storing information and instructions of a more permanent nature. In addition, computer system 600 may also include a data storage device 605 (e.g., a magnetic, optical, floppy, or tape drive or the like) for storing vast amounts of data. It should be noted that the software program for performing product consulting of the present invention can be stored either in volatile memory 603, data storage device 605, or in an external storage device (not shown).

Devices which are optionally coupled to computer system 600 include a display device 606 for displaying information to a computer user, an alpha-numeric input device 607 (e.g., a keyboard), and a cursor control device 608 (e.g., mouse, trackball, light pen, etc.) for inputting data, selections, updates, etc. Computer system 600 can also include a mechanism for emitting an audible signal (not shown).

Returning still to FIG. 6, optional display device 606 of FIG. 6 may be a liquid crystal device, cathode ray tube, or other display device suitable for creating graphic images and alpha-numeric characters recognizable to a user. Optional cursor control device 608 allows the computer user to dynamically signal the two dimensional movement of a visible symbol (cursor) on a display screen of display device 606. Many implementations of cursor control device 608 are known in the art including a trackball, mouse, touch pad, joystick, or special keys on alpha-numeric input 607 capable of signaling movement of a given direction or manner displacement. Alternatively, it will be appreciated that a cursor can be directed and activated via input from alpha-numeric input 607 using special keys and key sequence commands. Alternatively, the cursor may be directed and activated via input from a number of specially adapted cursor directing devices.

Furthermore, computer system 600 can include an input/output (I/O) signal unit (e.g., interface) 609 for interfacing with a peripheral device 610 (e.g., a computer network, modem, mass storage device, etc.). Accordingly, computer system 600 may be coupled in a network, such as a client/server environment, whereby a number of clients (e.g., personal computers, workstations, portable computers, mini-computers, terminals, etc.) are used to run processes for performing desired tasks. In particular, computer system 600 can be coupled in a system for compiling color analysis parameters.

The preferred embodiment of the present invention, a method and system for compiling color analysis parameters, is thus described. While the present invention has been described in particular embodiments, it should be appreciated that the present invention should not be construed as limited by such embodiments, but rather construed according to the following claims.

What is claimed is:

1. A method of compiling color analysis parameters, said method comprising:
   using an image analysis system for constructing a corrected color description of at least one test subject from an imaging source;
   using an accessor for accessing said color description of said at least one test subject;
   using an assigner for assigning said at least one test subject to a classification color according to said corrected color description; and
   using a correlator for correlating said classification color with a prescriptive recommendation.

2. The method as recited in claim 1 wherein said accessing comprises accessing a color description representative of a human skin color.

3. The method as recited in claim 2 further comprising:
   accessing an image of said at least one test subject; and
   automatically generating a skin color estimate of said at least one test subject.

4. The method as recited in claim 3 further comprising:
   using a plurality of image capture devices to generate a corresponding plurality of images of said at least one test subject;
   automatically generating a plurality of test color estimates of said at least one test subject wherein each of said plurality of test color estimates corresponds to one of said plurality of images;
   comparing said plurality of test color estimates with said skin color estimate.

5. The method as recited in claim 1 wherein said assigning further comprises:
   deriving a classification color description based upon an analysis of a plurality of corrected color descriptions of a corresponding plurality of test subjects.

6. The method as recited in claim 1 further comprising:
   comparing said corrected color description with a classification color description.

7. The method as recited in claim 6 further comprising:
   accessing a variation value;
   determining that a subsequently received corrected color description is within said variation value of said classification color description.

8. The method as recited in claim 1 wherein said assigning further comprises:
   accessing demographic data when assigning said at least one test subject to said classification color.

9. A system for compiling color analysis parameters, said system comprising:
   an image analysis system for automatically constructing a corrected color description of at least one test subject from an imaging source;
   an accessor for accessing said corrected color description of said at least one test subject;
   an assigner for assigning said at least one test subject to a classification color according to said corrected color description; and
   a correlator for correlating said classification color with a prescriptive recommendation.

10. The system of claim 9 wherein said accessor is for accessing a corrected color description representative of a human skin color.

11. The system of claim 10 further comprising:
    an input for accessing an image of said at least one test subject; and
    a skin color estimator for automatically generating a skin color estimate of said at least one test subject.

12. The system of claim 11 wherein said accessor accesses a plurality of images of said at least one test subject captured by a corresponding plurality of image capture devices and wherein said comparator is further for said plurality of test color estimates with said skin color estimate.

13. The system of claim 9 wherein said assigner is further for deriving a classification color description based upon an analysis of a plurality of corrected color descriptions of a corresponding plurality of test subjects.

14. The system of claim 9 further comprising:
    a comparator for comparing said color corrected description with a classification color description.

15. The system of claim 14 wherein said accessor is further for accessing a variation value and wherein said comparator is further for determining that a subsequently received corrected color description is within said variation value of said classification color description.

16. The system of claim 9 wherein said accessor is further for accessing demographic data and wherein said assigner is further for using said demographic data when assigning said at least one test subject to said classification color.

17. A computer-usable medium having computer-readable program code embodied therein for causing a computer system to perform a method of compiling color analysis parameters, said method comprising:
    using an image analysis system for constructing a corrected color description of at least one test subject from an imaging source;
    using an accessor for accessing said color description of said at least one test subject;
    using an assigner for assigning said at least one test subject to a classification color according to said corrected color description; and
    using a correlator for correlating said classification color with a prescriptive recommendation.

18. The computer-usable medium of claim 17 wherein said accessing comprises accessing a color description representative of a human skin color.

19. The computer-usable medium of claim 18 wherein said method further comprises:
    accessing an image of said at least one test subject; and
    automatically generating a skin color estimate of said at least one test subject.

20. The computer-usable medium of claim 19 wherein said method further comprises:
    using a plurality of image capture devices to generate a corresponding plurality of images of said at least one test subject;
    automatically generating a plurality of test color estimates of said at least one test subject wherein each of said plurality of test color estimates corresponds to one of said plurality of images;
    comparing said plurality of test color estimates with said skin color estimate.

21. The computer-usable medium of claim 17 wherein said assigning further comprises:
    deriving a classification color description based upon an analysis of a plurality of corrected color descriptions of a corresponding plurality of test subjects.

22. The computer-usable medium of claim 17 wherein said method further comprises:
    comparing said corrected color description with a classification color description.

23. The computer-usable medium of claim 22 wherein said method further comprises:
    accessing a variation value;
    determining that a subsequently received corrected color description is within said variation value of said classification color description.

24. The computer-usable medium of claim 17 wherein said assigning further comprises:
    accessing demographic data when assigning said at least one test subject to said classification color.

* * * * *